US009616692B1

(12) United States Patent
Rabe et al.

(10) Patent No.: US 9,616,692 B1
(45) Date of Patent: Apr. 11, 2017

(54) SYSTEMS AND METHODS FOR PROVIDING A SERVICE INTERFACE MECHANISM

(71) Applicant: The Procter & Gamble Company, Cincinnati, OH (US)

(72) Inventors: Thomas Elliot Rabe, Baltimore, MD (US); Paul John Edward Vernon, West Chester, OH (US); Grant Edward Anders Striemer, Fairfield Township, OH (US); Janette Villalobos Lingoes, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 14/960,907

(22) Filed: Dec. 7, 2015

(51) Int. Cl.
*B41J 29/38* (2006.01)
*H04L 29/08* (2006.01)
*B41J 3/36* (2006.01)

(52) U.S. Cl.
CPC ............... *B41J 29/38* (2013.01); *B41J 3/36* (2013.01); *H04L 67/12* (2013.01)

(58) Field of Classification Search
CPC .............. B41J 29/38; B41J 3/36; H04L 67/12
See application file for complete search history.

(56) References Cited

U.S. PATENT DOCUMENTS

| 6,312,124 | B1 | 11/2001 | Esormeaux |
| 6,494,633 | B1 * | 12/2002 | Crosby ............... B41J 3/36 400/663 |
| 7,648,364 | B2 | 1/2010 | Dauga |
| 7,890,152 | B2 | 2/2011 | Edgar |
| 8,007,062 | B2 | 8/2011 | Edgar |
| 8,027,505 | B2 | 9/2011 | Edgar |
| 8,184,901 | B2 | 5/2012 | Edgar |
| 8,231,292 | B2 | 7/2012 | Rabe |
| 8,695,610 | B2 | 4/2014 | Samain |
| D750,225 | S | 2/2016 | Rabe |

(Continued)

FOREIGN PATENT DOCUMENTS

FR 2933585 B1 10/2011
JP 2006297691 A 11/2006

(Continued)

*Primary Examiner* — Justin Seo
(74) *Attorney, Agent, or Firm* — S. Robert Chuey; Steven W. Miller (57) ABSTRACT

Included are embodiments for providing a service station interface. Some embodiments of a system include a service station for receiving a handheld jet dispensing apparatus in a service compartment of the service station and a memory component. The memory component may store logic that, when executed by a processor, causes the system to determine if a maintenance function is to be implemented on the handheld jet dispensing apparatus, in response to determining that the maintenance function is to be implemented, determine if the service station is closed, and if the service station is closed, engage an interface function of the service station during the maintenance function, wherein the interface function is related to accessing the service compartment. In some embodiments, the logic causes the system to determine that the maintenance function has ended and, in response to determining that the maintenance function has ended, disengage the interface function.

20 Claims, 10 Drawing Sheets (56) References Cited

U.S. PATENT DOCUMENTS

| | | |
|---|---|---|
| D750,772 S | 3/2016 | Rabe |
| 2003/0060810 A1 | 3/2003 | Syrowicz |
| 2008/0194971 A1 | 8/2008 | Edgar |
| 2009/0025747 A1 | 1/2009 | Edgar |
| 2010/0224205 A1 | 9/2010 | Mitra |
| 2010/0224209 A1 | 9/2010 | Rabe |
| 2010/0224210 A1 | 9/2010 | Rabe |
| 2010/0224211 A1 | 9/2010 | Rabe |
| 2011/0129283 A1 | 6/2011 | Samain |
| 2011/0155161 A1 | 6/2011 | Samain |
| 2011/0159463 A1 | 6/2011 | Samain |
| 2011/0162673 A1 | 7/2011 | Samain |
| 2011/0205296 A1* | 8/2011 | Colombat ............ B41J 2/16544 347/33 |
| 2015/0360015 A1 | 12/2015 | Rabe |
| 2015/0360016 A1 | 12/2015 | Rabe |
| 2015/0360017 A1 | 12/2015 | Rabe |
| 2015/0360018 A1 | 12/2015 | Baker |
| 2015/0360019 A1 | 12/2015 | Clancy |
| 2015/0360020 A1 | 12/2015 | Wu |
| 2016/0022006 A1 | 1/2016 | Rabe |
| 2016/0022008 A1 | 1/2016 | Rabe |
| 2016/0022009 A1 | 1/2016 | Rabe |
| 2016/0022010 A1 | 1/2016 | Rabe |
| 2016/0022011 A1 | 1/2016 | Rabe |
| 2016/0022972 A1 | 1/2016 | Rabe |
| 2016/0184755 A1* | 6/2016 | Chen ...................... G05B 15/02 700/275 |

FOREIGN PATENT DOCUMENTS

| | | |
|---|---|---|
| WO | WO2009036876 | 3/2009 |
| WO | WO2010004531 | 1/2010 |

* cited by examiner

SYSTEMS AND METHODS FOR PROVIDING A SERVICE INTERFACE MECHANISM

FIELD OF THE INVENTION

The present application relates generally to systems and methods for providing a service station routine and specifically to maintenance and locking mechanisms that may be utilized for a handheld device service station.

BACKGROUND OF THE INVENTION

Inkjet devices, piezo and thermal, are common for both personal and industrial printing purposes. Most commonly, such devices are found in consumer homes as a means to create high quality prints and photos. In consumer applications there is a high need for reliable performance with minimal effort from the consumer. Because of this, all existing consumer printing devices contain sophisticated processes for maintaining a high print quality. It is common for consumer inkjet printing devices to contain thousands of individual nozzles with each nozzle as small as 5-20 microns. Additionally, most inks in such devices are volatile and are prone to drying out quickly when exposed to air. Due to the small and numerous nozzles and fast dry times, it is difficult to keep all nozzles working properly over the course of thousands of printed pages and potentially long periods of time between prints. Due to these requirements, much effort has been taken by printer manufacturers to devise mechanisms that keep the printing nozzles performing well. Most consumers have no knowledge of all of the servicing that occurs to ensure good print quality as it occurs automatically.

While servicing nozzles of a stationary inkjet printing device is known, there has been little need to consider how to automatically service inkjet nozzles for a handheld printing device. Handheld inkjet printing devices are uncommon and usually used for industrial tasks like labeling boxes during manufacturing. In such cases the servicing needs of nozzles is performed manually. These handheld printers require removal of the inkjet cartridge after each use and manually wiping and capping the printhead. For such industrial applications this may be acceptable. However, there has not been the need to create an automated servicing solution for handheld printing devices.

SUMMARY OF THE INVENTION

Included are embodiments for providing a service station routine. Some embodiments of a system include a service station for receiving a handheld jet dispensing apparatus and a memory component that stores logic. When the logic is executed by a processor, the logic may cause the system to, in response to the service station receiving the handheld jet dispensing apparatus, identify the handheld jet dispensing apparatus, where identifying the handheld jet dispensing apparatus includes determining a time of a previous maintenance to the handheld jet dispensing apparatus. In some embodiments, the logic causes the system to determine whether the time of the previous maintenance meets a predetermined threshold, in response to determining that the time of the previous maintenance meets a predetermined threshold, determine a desired maintenance routine to execute and execute the desired maintenance routine, and record a current time as the time of the previous maintenance.

Also included are embodiments of a method. Some embodiments of the method include receiving a handheld jet dispensing apparatus at a service station, determining whether the handheld jet dispensing apparatus is registered, and in response to determining that the handheld jet dispensing apparatus is registered, determining a time of a previous maintenance to the handheld jet dispensing apparatus. Some embodiments of the method include determining whether the time of the previous maintenance meets a predetermined threshold, in response to determining that the time of the previous maintenance meets the predetermined threshold, determining a desired maintenance routine to execute and execute the desired maintenance routine and recording a current time as the time of the previous maintenance.

Also included are embodiments of a non-transitory computer-readable medium. Some embodiments of the non-transitory computer-readable medium include logic that, when executed by a processor, causes a device to, in response to the service station receiving a handheld jet dispensing apparatus, identify the handheld jet dispensing apparatus, where identifying the handheld jet dispensing apparatus includes determining whether the handheld jet dispensing apparatus is due for maintenance. In some embodiments, the logic causes the device to, in response to determining that the handheld jet dispensing apparatus is due for maintenance, determine a desired maintenance routine to execute and execute the desired maintenance routine on the handheld jet dispensing apparatus while the handheld jet dispensing apparatus resides in the service station and record data regarding the handheld jet dispensing apparatus and the maintenance.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION OF THE INVENTION

Embodiments disclosed herein include systems and methods for providing service station routines. Specifically, the embodiments described herein may be configured to perform maintenance functions and interface functions for a handheld jet dispensing apparatus. The maintenance functions may include a function for maintaining a desired fluid homogeneity of a solution that is stored and dispensed by the handheld jet dispensing apparatus. Similarly, some embodiments may include a maintenance function for cleaning a camera lens and/or a cassette nozzle on the handheld jet dispensing apparatus. Some embodiments may include maintenance functions for calibration of the handheld jet dispensing apparatus and/or cleaning calibration components of the service station and/or handheld jet dispensing apparatus.

Similarly, some embodiments may be configured for providing a service station interface function (such as a first interface function, a second interface function, a third interface function, etc.). The interface function may include a locking mechanism to prevent access to the service compartment, a visual indication to inform a user of restricted access to the service compartment, a tactile indication to inform the user of restricted access to the service compartment, audible indication to inform the user of restricted access to the service compartment, a timer to determine a time that restricted access to the service compartment will be removed, and/or other interfaces.

As an example, some embodiments may be configured to determine when a maintenance function is executed and engage the locking mechanism of the service station during the maintenance function. The locking mechanism may prevent the user from interrupting the maintenance function when such interruption could be harmful to the handheld jet dispensing apparatus or at an otherwise undesirable time. Some embodiments may be configured to receive a user instruction to provide access to the interior or the service station and determine an appropriate time for interrupting the maintenance function and disengaging the locking mechanism. Some embodiments may be configured to override the maintenance function and provide immediate access to the handheld jet dispensing apparatus. Similarly, the service station may reengage the locking mechanism upon return of the handheld jet dispensing apparatus is returned to the service station and the service station is closed.

Similarly, some embodiments may be configured to determine a usage of solution to determine whether a cartridge should be replaced. In response to determining that the cartridge should be replaced, an indication to the user to replace the cartridge may be provided.

Figure 1:
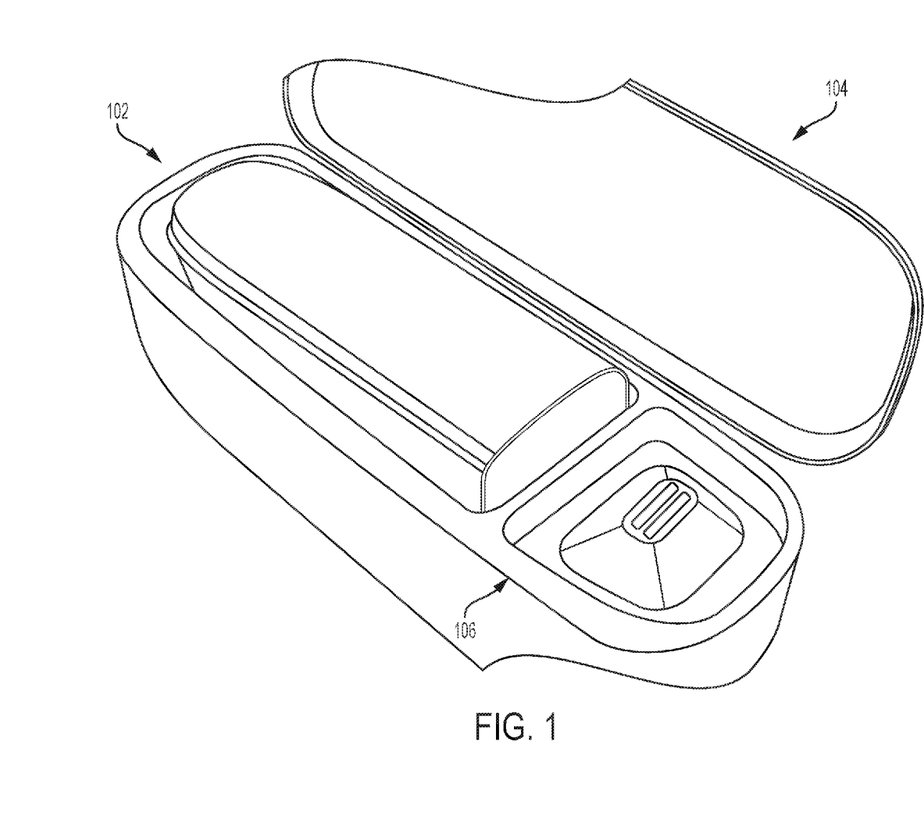
FIG. 1 depicts a handheld jet dispensing apparatus and service station, according to embodiments disclosed herein.

Referring now to the drawings, FIG. 1 depicts a handheld jet dispensing apparatus 102 and service station 104, according to embodiments disclosed herein. As illustrated, the handheld jet dispensing apparatus 102 may be configured for providing coverage of skin imperfections, applying solutions to surfaces, applying solutions to clothing, and/or applying solutions to other items. The handheld jet dispensing apparatus 102 may also include a nozzle cover 106, which may be stored separately in the service station 104 and attached to the handheld jet dispensing apparatus 102 when in use. The service station 104 may be structured to receive the handheld jet dispensing apparatus 102, whether separated from the nozzle cover 106 in some embodiments and/or together with the handheld jet dispensing apparatus 102.

Regardless, a user may place the handheld jet dispensing apparatus 102 into a service compartment of the service station 104 for storage, charging, calibration, and/or for performing one or more maintenance functions. On the exterior surface of the service station 104 (or elsewhere, such as on a remote device), a user interface may be provided, which may include a display for providing one or more soft buttons, alerts, and/or other data. In some embodiments, the user interface may include one or more tactile buttons, depending on the embodiment. The display may include a liquid crystal display (LCD), light emitting diode (LED), and/or other type of visual display. Depending on the embodiment, the display may include a touchscreen to provide "soft buttons" or other options. The audio device may include a speaker or other device for producing sound. The tactile button may include an input device or other hardware for receiving input from a user.

The service station 104 may also include a locking mechanism for locking access to the service compartment of the service station 104. The locking mechanism may include any type of hardware lock that may be controlled by a computing device. As discussed in more detail below, the computing device may be integrated into the service station 104 and/or into the handheld jet dispensing apparatus 102.

Some embodiments may include one or more sensors on the service station 104 for determining whether the service station 104 is open or closed. As an example, a button sensor, proximity sensor, and/or the like may be included in the service station 104. Similarly, the locking mechanism may include a sensor to determine when the locking mechanism is properly engaged, with the service station 104 in the closed position.

In some embodiments, the service station 104 may include a first physical contact and a second physical contact may reside on the handheld jet dispensing apparatus 102 for charging the handheld jet dispensing apparatus 102. Another physical contact may reside on the service station 104 and yet another physical contact may reside on the handheld jet dispensing 102 apparatus for facilitating communication (wired and/or wireless) between the service station 104 and the handheld jet dispensing apparatus 102. In some embodiments, a first wireless connection between the service station 104 and the handheld jet dispensing apparatus 102 for charging the handheld jet dispensing apparatus 102 may be provided. Similarly, some embodiments may include a second wireless connection between the service station 104 and the handheld jet dispensing apparatus 102 for facilitating communication between the service station 104 and the handheld jet dispensing apparatus 102.

Figures 2A, 2B, 2C, 2D:
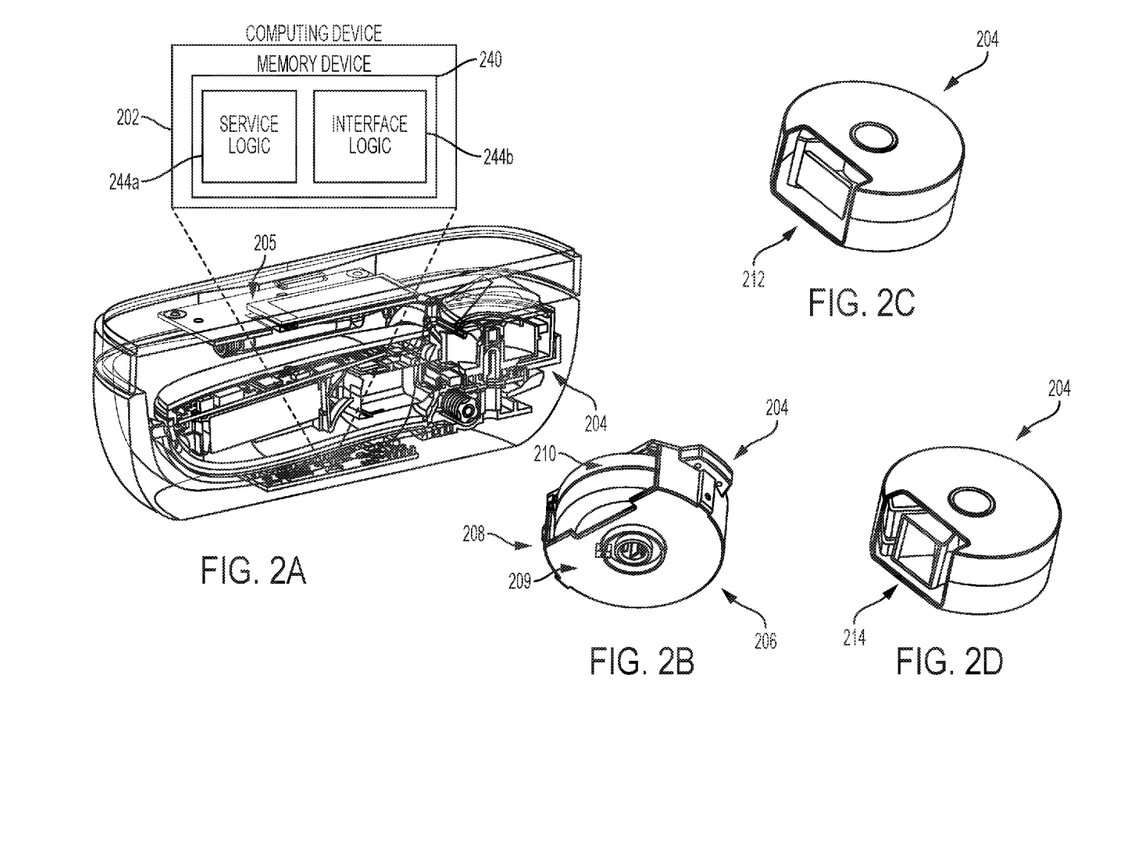
FIGS. 2A-2D depict another view of the handheld jet dispensing apparatus and cassette, which may be utilized for providing one or more maintenance functions, according to embodiments described herein.

FIGS. 2A-2D depict another view of the handheld jet dispensing apparatus 102 and a cassette 204, which may be utilized for providing one or more maintenance functions, according to embodiments described herein. As illustrated in FIG. 2A, the service station 104 may include a computing device 202 and a cassette 204. The computing device 202 may include service logic 244*a* and interface logic 244*b*. As discussed in more detail below, the service logic 244*a* may include one or more algorithms for performing maintenance functions, such as a cleaning process, a calibration process, etc. In some embodiments, the service logic 244*a* may include logic for providing a timer, such as a maintenance timer for documenting when maintenance, calibration, etc. has been performed. In some embodiments, the maintenance timer may be provided on the handheld jet dispensing apparatus 102. The interface logic 244*b* may include one or more algorithms for implementing the locking mechanism and/or providing an instruction to implement the locking mechanism or other interface function, such as via a display device 205. The display device 205 may include a liquid crystal diode (LCD) display, light emitting diode (LED) display, and/or other mechanism for providing visual output.

It should be understood that while the computing device 202 may be included in the service station 104, some embodiments may be configured with the computing device 202, which includes a memory device 240 integrated into the handheld jet dispensing apparatus 102. In such embodiments, the handheld jet dispensing apparatus 102 may be configured to determine maintenance functions and/or interface mechanisms that are desired, and send commands and/or instructions to the service station 104 for implementing those features.

As illustrated in FIGS. 2B-2D, the cassette 204 may include a cylindrical device that may include components for cleaning a camera and/or a cassette nozzle on the handheld jet dispensing apparatus 102. Specifically, the cassette 204 may include an exterior portion 206 with an opening 208, as well as an interior portion 210, which include wiping elements for a camera lens and nozzle. The cassette 204 may be configured to reside within the exterior portion 206 and rotate along a center axis of the cassette 204. The interior portion 210 may include a calibration target 212 (FIG. 2C), as well as a spittoon 214 (FIG. 2D). Accordingly, the cassette 204 may utilize these features for cleaning, calibrating, and/or otherwise maintaining the handheld jet dispensing apparatus 102. Also included is a photosensor 209 (FIG. 2A) or other sensor, which may be utilized for positioning the cassette 204 in the service station 104.

Figure 3:
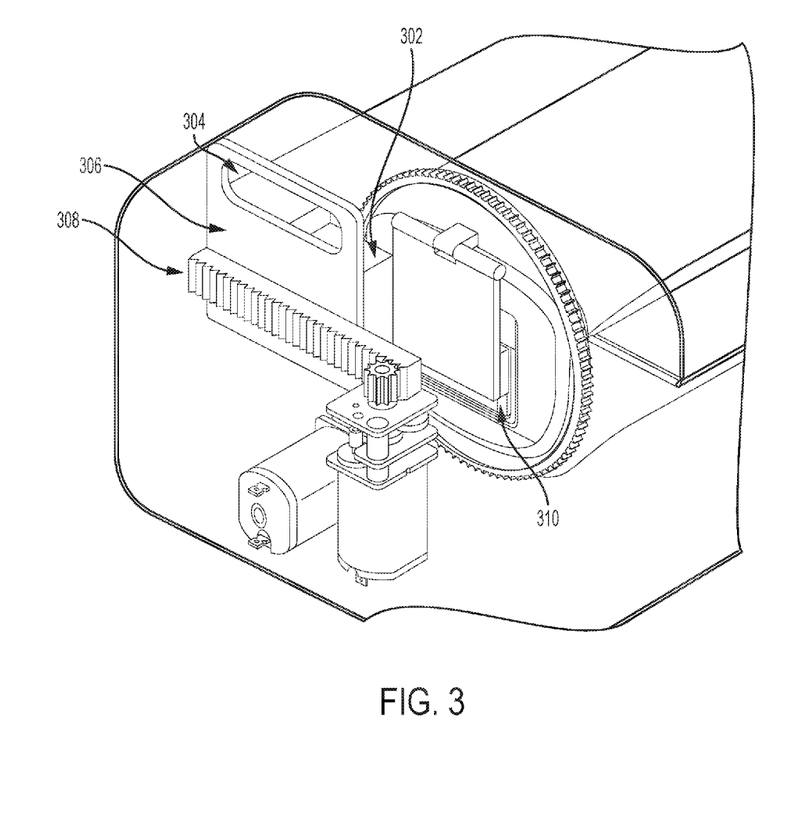
FIG. 3 depicts a plurality of internal components of the service station, which includes elements for executing a maintenance function, according to embodiments described herein.

FIG. 3 depicts a plurality of internal components of the service station 104, which includes elements for executing a maintenance function, according to embodiments described herein. As illustrated, the service station 104 may include a servicing system that includes a linear actuation system including a linear actuation member 308 that is actuated in a linear fashion by actuator 306. In this embodiment, the linear actuation member 308 is a rack-type gear that is moved linearly with engagement with a pinion-type gear as the gear rotates. The linear actuation member 308 includes a wiping element 304, a composition receiving element 302 in the form of an absorbing pad and can also include a calibration element (not shown), as described above. The linear actuation member 308 may also include a handle element that can be used to remove the servicing system (e.g., for replacement). In other embodiments, serving systems may not be replaceable.

Any suitable gear arrangement can be used to effectuate either rotational and/or linear movement of the servicing system, such as spur gears, rack and pinion gears, internal gears, face gears, helical gears, worm gears, etc. Further, other, non-gear linkages may be used, such as cams. In some embodiments, an actuator may directly actuate the servicing system.

Figure 4:
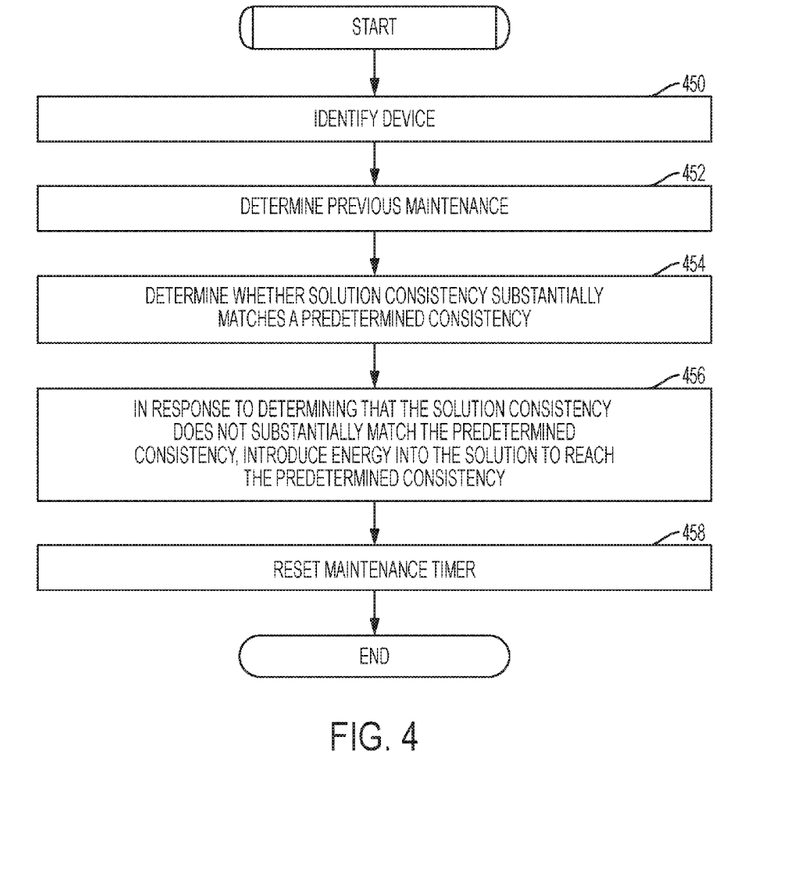
FIG. 4 depicts a flowchart for imparting energy into a reservoir of the handheld jet dispensing apparatus, according to embodiments described herein.

FIG. 4 depicts a flowchart for imparting energy into a reservoir of the handheld jet dispensing apparatus 102, according to embodiments described herein. As illustrated in block 450, the service station 104 may receive the handheld jet dispensing apparatus 102 and identify the device that was received. The handheld jet dispensing apparatus 102 may be configured to communicate with the service station 104 to identify itself, and/or provide other information. The other information may include date of last service, type of last service, malfunctions that have occurred since last service (or at other times), etc. With this information in block 452, the service station 104 may determine the previous maintenance that the handheld jet dispensing apparatus 102 has received. In block 454, the service station 104 may determine whether a fluid homogeneity of the solution substantially matches a predetermined fluid homogeneity. Specifically, the solution in the handheld jet dispensing apparatus 102 may be configured with one or more ingredients for treating skin imperfections, applying solutions to clothing, applying solutions to surfaces, and/or applying solutions to other items. As discussed above, the solution may take any of a plurality of different forms, depending on the particular treatment being performed. Accordingly, if the handheld jet dispensing apparatus 102 and/or the reservoir are stationary or otherwise unused for a period of time, the solution may settle and/or the ingredients that make up the solution may separate. As a consequence, the solution may lack the desired fluid homogeneity for use in the handheld jet dispensing apparatus 102. Thus, the service station 104 (and/or the handheld jet dispensing apparatus 102) may include one or more sensors for determining the fluid homogeneity of the solution.

As an example, the handheld jet dispensing apparatus 102 may include a timer to determine movement, use, and/or timing of movement or use of the handheld jet dispensing apparatus 102 to determine whether the time exceeds a time that would change the fluid homogeneity of the solution beyond a desired level (which may vary, depending on the particular solution). Similarly, some embodiments may be configured with an opacity sensor or light sensor to determine whether the solution has the desired opacity. If the opacity of the solution is not at a desired level, the service station 104 may determine that the fluid homogeneity does not meet a predetermined fluid homogeneity. Other sensors and determinations may also be made.

As another example, if the cartridge is a new cartridge that has never been used, some embodiments will expend specific amount of energy and length of time the energy is introduced to reach the desired fluid homogeneity. In these embodiments, an identifier on the cartridge may be accessed to determine the contents of the cartridge, whether the cartridge is new or previously used, and/or other information. If the cartridge is determined as new, a new cartridge routine may be implemented for reaching the desired fluid homogeneity. If the cartridge is used, a unique service routine may be run, based on the type of solution, time since last use, etc. In some embodiments, a number of droplets may be tracked, such that if the cartridge is determined to be used, an age from production or time since first use may signal to the user that the cartridge should be replaced. In other embodiments the contents of the cartridge will determine the type of servicing routine required for a specific formulation.

In embodiments where a cartridge stays in the handheld jet dispensing apparatus 102 for the entire duration of the life of the cartridge, service station 104 may determine a time that the handheld jet dispensing apparatus 102 (and thereby the cartridge) has been out of the service station 104. Once a predetermined threshold of time is reached, the service station 104 will to introduce a predetermined amount of energy, type of energy and time of energy to impart, based on the threshold, the solution, and/or other factors. In embodiments where the consumer is able to employ multiple cartridges in the handheld jet dispensing apparatus 102 and thereby will be removing cartridge A and inserting cartridge B, embodiments may be configured to recognize the cartridge (new, used, how many uses when last used, etc.) and determine a specific routine based on the solution in the cartridge. Some formulations will only cap and/or wipe, while others (unstable formulations—like pigmented) may require energy to be imparted to re-disperse the solution, as well as wiping and/or capping.

Returning to FIG. 4, in block 456, in response to determining that the solution consistency does not substantially match the predetermined consistency, energy may be introduced into the solution to reach the desired consistency (and/or other acceptable consistency level). As an example, imparting energy may include shaking, vibrating, spinning, flipping, introducing a magnetic field, introducing an electric field, etc. to adequately mix the solution and achieve the desired consistency. In block 458, once the fluid homogeneity reaches the acceptable level, the maintenance timer may be reset.

Figure 5:
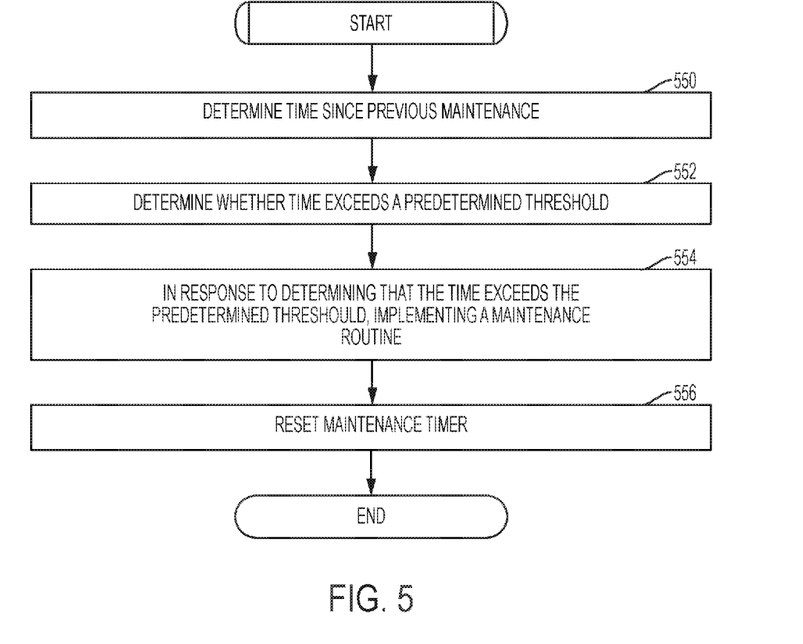
FIG. 5 depicts a flowchart for the service station to determine when to perform a maintenance function to the handheld jet dispensing apparatus, according to embodiments described herein.

FIG. 5 depicts a flowchart for the service station 104 to determine when to perform a maintenance function to the handheld jet dispensing apparatus 102, according to embodiments described herein. As illustrated in block 550, a time since a previous maintenance may be determined. As discussed above, the determination may be made in response to receipt of information from the handheld jet dispensing apparatus 102. In some embodiments, the service station 104 may record a previous maintenance to the received handheld jet dispensing apparatus 102 and make a determination from that information. The maintenance may include camera cleaning, calibration, nozzle cleaning, and/or other maintenance and thus the service station 104 may make one or more determinations regarding a previous maintenance. Regardless, in block 552, a determination may be made regarding whether the time exceeds a predetermined threshold for maintenance. Specifically, the handheld jet dispensing apparatus 102 may perform optimally if calibrated, cleaned, and/or otherwise maintained according to a predetermined schedule. As there might be a plurality of different schedules, based on the type of maintenance, this determination may include checks for one or more of types of maintenance have exceeded the predetermined threshold for that type of maintenance. In block 554, in response to determining that the time exceeds the predetermined time, a predetermined maintenance routine may be implemented. In block 556, the maintenance timer may be reset and a current time may be recorded as the time of the previous maintenance.

Figure 6:
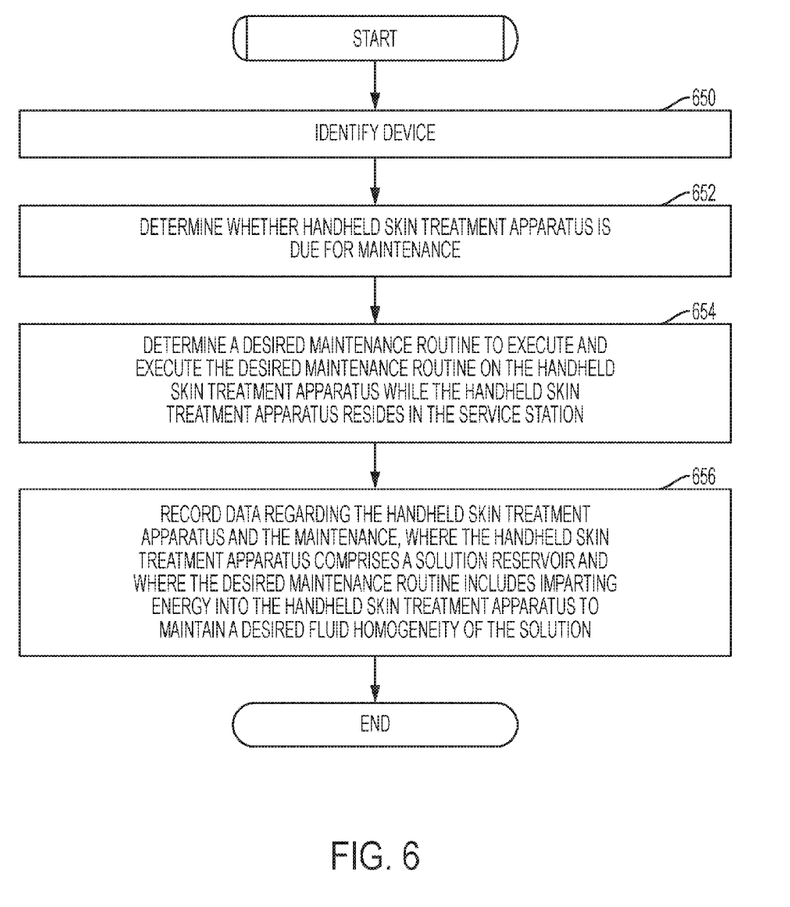
FIG. 6 depicts a flowchart for determining a desired maintenance function for performing on the handheld jet dispensing apparatus, according to embodiments described herein.

FIG. 6 depicts a flowchart for determining a desired maintenance function for performing on the handheld jet dispensing apparatus 102, according to embodiments described herein. In block 650, the handheld jet dispensing apparatus 102 may be identified. In block 652, a determination regarding whether the handheld jet dispensing apparatus 102 is due for maintenance may be made. In block 654, a determination may be made regarding a desired maintenance routine to execute. Also in block 654, the desired maintenance routine may be executed on the handheld jet dispensing apparatus 102 while the handheld jet dispensing apparatus 102 resides in the service station 104. In block 656, data regarding the handheld jet dispensing apparatus 102 and the maintenance may be recorded, where the handheld jet dispensing apparatus 102 comprises a cartridge and where the desired maintenance routine includes imparting energy into the handheld jet dispensing apparatus 102 to maintain a desired fluid homogeneity of the solution.

Figure 7:
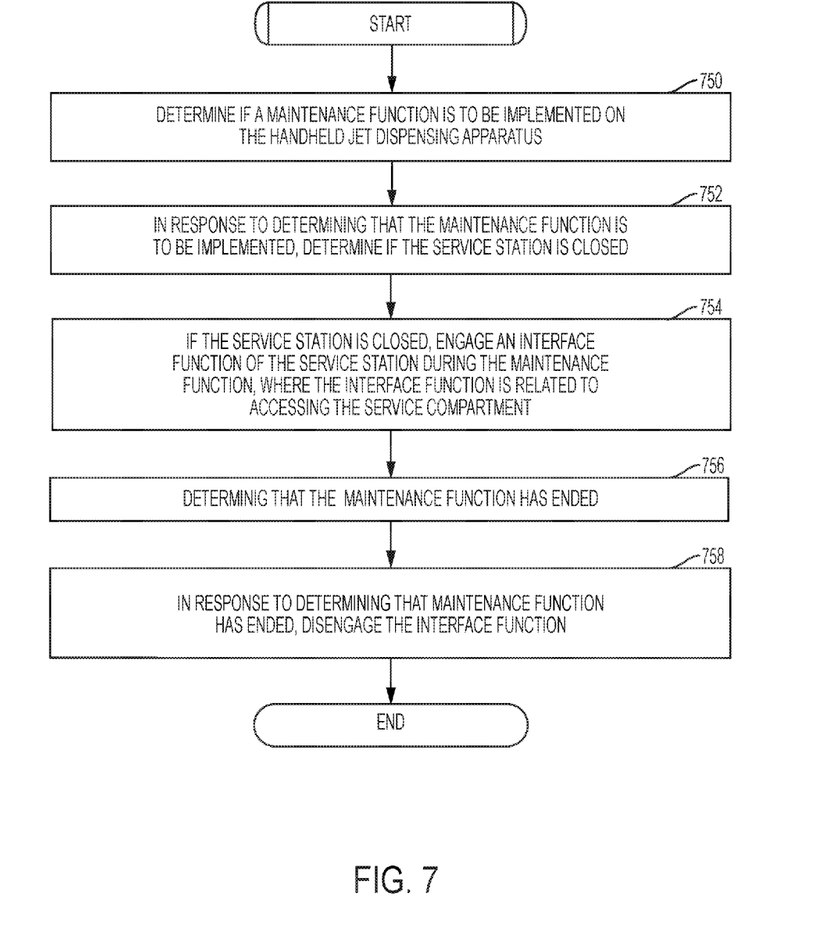
FIG. 7 depicts a flowchart for engaging a locking mechanism on a service station, according to embodiments described herein.

FIG. 7 depicts a flowchart for engaging a locking mechanism on a service station 104, according to embodiments described herein. As illustrated in block 750 a determination may be made regarding whether a maintenance function is to be implemented on the handheld jet dispensing apparatus 102. In block 752, in response to determining that the maintenance function is to be implemented, a determination may be made regarding whether the service station 104 is closed. In block 754, if it is determined that the service station 104 is closed, an interface function of the service station 104 (such as a first interface function) may be engaged during the maintenance function, where the interface function is related to accessing the service compartment. In block 756, a determination may be made regarding whether the maintenance function has ended. In block 758, in response to determining that the maintenance function has ended, the interface function may be disengaged.

Depending on the particular embodiment, the interface function may include locking mechanism to prevent access to the service compartment, a visual output to inform a user of restricted access to the service compartment, a tactile output to inform the user of restricted access to the service compartment, audible indication to inform the user of restricted access to the service compartment, a timer to determine a time that restricted access to the service compartment will be removed, and/or other interfaces. Other functions may also be provided.

Figure 8:
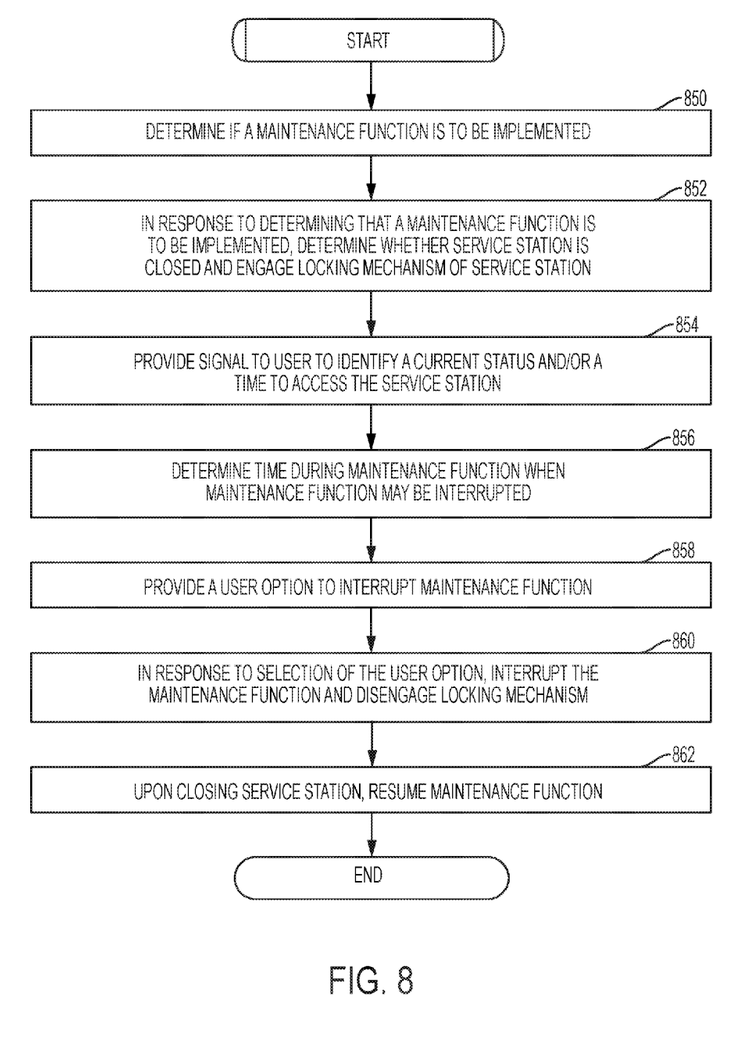
FIG. 8 depicts a flowchart for interrupting a maintenance function of the service station, according to embodiments described herein.

FIG. 8 depicts a flowchart for interrupting a maintenance function of the service station 104, according to embodiments described herein. As illustrated in block 850, a determination may be made regarding whether a maintenance function is to be implemented. In block 852, in response to determining that the maintenance function is to be implemented, a determination may be made regarding whether the service station 104 is closed and, if so, the locking mechanism may be engaged. In block 854, a signal may be provided to a user to identify a current status of the service station 104 and/or a time that the service station 104 may be accessed. In block 856, a determination may be made regarding a time during the maintenance function when the maintenance function may be interrupted. In block 858, a user option (such as a first user option, a second user option, etc.) may be provided to interrupt the maintenance function. In block 860, in response to a user selection of the user option, the maintenance function may be interrupted and the locking mechanism may be disengaged. In block 862, upon closing the service station 104, the locking mechanism may be reengaged and the maintenance function may be resumed.

Figure 9:
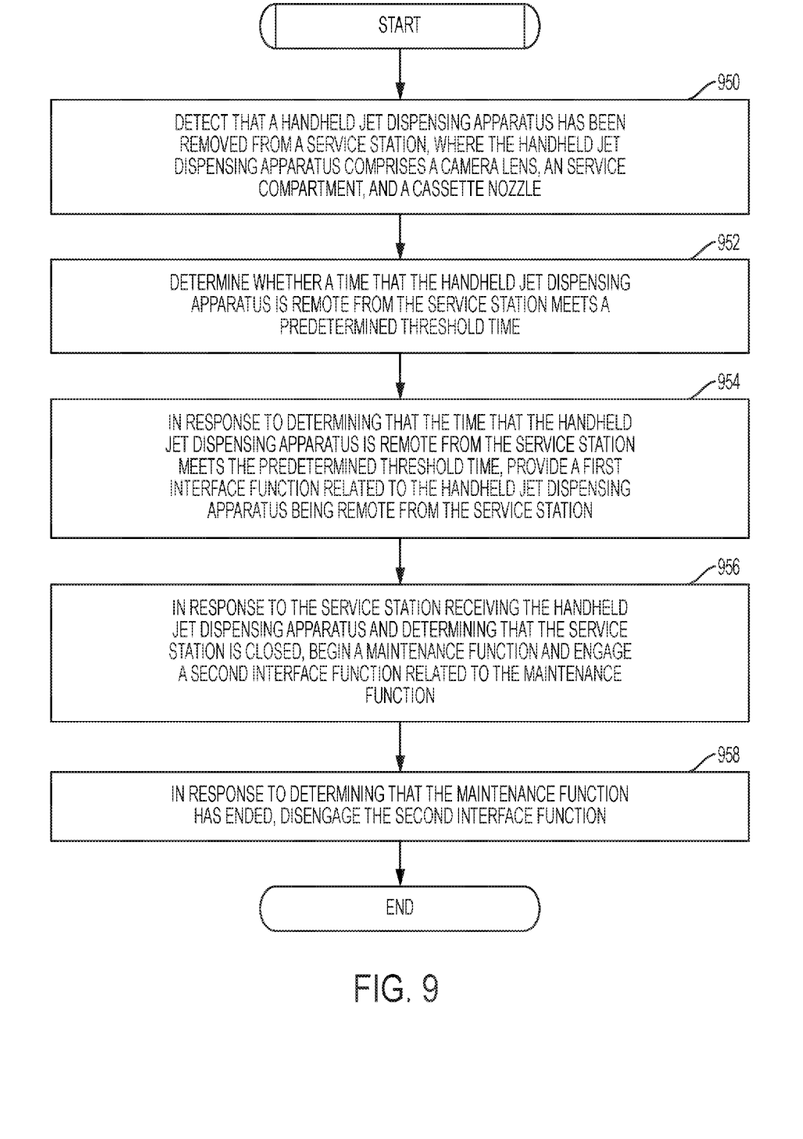
FIG. 9 depicts a flowchart for engaging an interface function, according to embodiments described herein.

FIG. 9 depicts a flowchart for engaging an interface function, according to embodiments described herein. As illustrated in block 950, a detection that the handheld jet dispensing apparatus 102 has been removed from the service station 104 may be made, where the handheld jet dispensing apparatus 102 includes a camera lens, and a cartridge with microfluidic jetting nozzles. In block 952, a determination regarding whether a time that the handheld jet dispensing apparatus 102 is remote from the service station 104 meets a predetermined threshold time. In block 954, in response to determining that the time that the handheld jet dispensing apparatus 102 is remote from the service station 104 meets the predetermined threshold time, a first interface function related to the handheld jet dispensing apparatus 102 being remote from the service station 104 may be provided. In block 956, in response to the service station 104 receiving the handheld jet dispensing apparatus 102 and determining that the service station 104 is closed, a maintenance function may begin and a second interface function related to the maintenance function may be engaged. In block 958, in response to determining that the maintenance function has ended, the second interface function may be disengaged.

Figure 10:
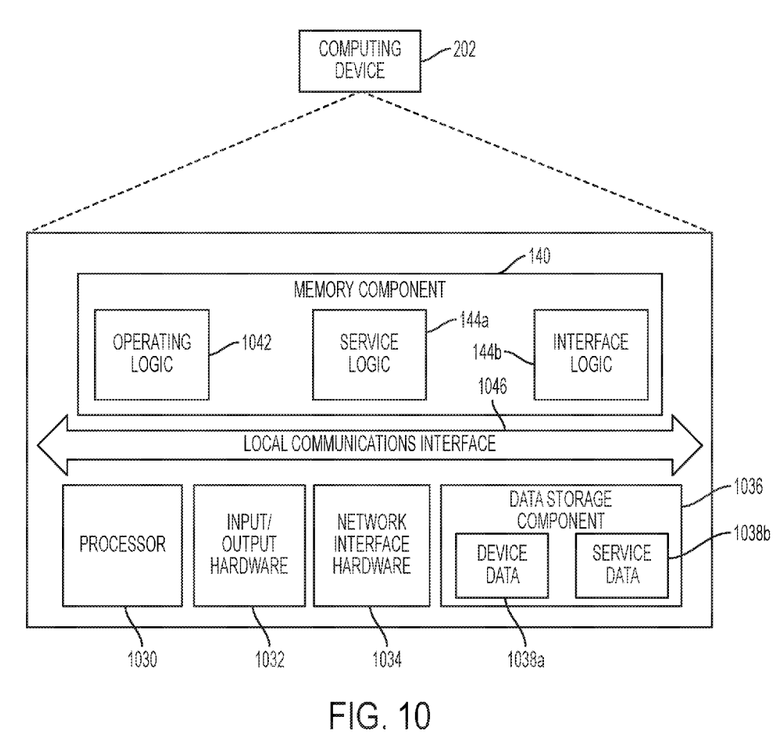
FIG. 10 depicts a computing device for implementing the maintenance functions and/or locking mechanism, according to embodiments described herein.

FIG. 10 depicts a computing device 202 for implementing the maintenance functions and/or interface functions, according to embodiments described herein. The computing device 202 includes a processor 1030, input/output hardware 1032, network interface hardware 1034, a data storage component 1036 (which stores device data 1038*a*, service data 1038*b*, and/or other data), and the memory component 240. The memory component 240 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the computing device 202 and/or external to the computing device 202.

The memory component 240 may store operating system logic 1042, the service logic 244*a* and the interface logic 244*b*. The service logic 244*a* and the interface logic 244*b* may each include a plurality of different pieces of logic, each of which may be embodied as a computer program, firmware, and/or hardware, as an example. A local interface 1046 is also included in FIG. 10 and may be implemented as a bus or other communication interface to facilitate communication among the components of the computing device 202.

The processor 1030 may include any processing component operable to receive and execute instructions (such as from a data storage component 1036 and/or the memory component 240). As described above, the input/output hardware 1032 may include and/or be configured to interface with the components of FIG. 10.

The network interface hardware 1034 may include and/or be configured for communicating with any wired or wireless networking hardware, including an antenna, a modem, a LAN port, wireless fidelity (Wi-Fi) card, WiMax card, Bluetooth™ module, mobile communications hardware, and/or other hardware for communicating with other networks and/or devices. From this connection, communication may be facilitated between the computing device 202 and other computing devices, such as those depicted in FIG. 1.

The operating system logic 1042 may include an operating system and/or other software for managing components of the computing device 202. As discussed above, the service logic 244*a* may reside in the memory component 240 and may be configured to cause the processor 1030 to determine a maintenance function to implement, as well as determine maintenance timers, solution consistency, etc. Similarly, the interface logic 244*b* may be utilized to provide one or more of the interface functions described herein, such as determining whether the service station 104 is closed and/or locked, implement the locking function, determine when a maintenance function may be interrupted, and the like.

It should be understood that while the components in FIG. 10 are illustrated as residing within the computing device 202, this is merely an example. In some embodiments, one or more of the components may reside external to the computing device 202 and/or the computing device 202 may be configured as a mobile device. It should also be understood that, while the computing device 202 is illustrated as a single device, this is also merely an example. In some embodiments, the service logic 244*a* and the interface logic 244*b* may reside on different computing devices. As an example, one or more of the functionalities and/or components described herein may be provided by the handheld jet dispensing apparatus 102 and/or other devices, which may be communicatively coupled to the computing device 202. These computing devices may also include hardware and/or software for performing the functionality described herein.

Additionally, while the computing device 202 is illustrated with the service logic 244*a* and the interface logic 244*b* as separate logical components, this is also an example. In some embodiments, a single piece of logic may cause the computing device 202 to provide the described functionality.

Any and all documents cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be understood to those skilled in the art that various other changes and modifications can be made without departing from the spirit and scope of the invention. It is therefore intended to cover in the appended claims all such changes and modifications that are within the scope of this invention.

What is claimed is:

1. A system for providing a service station interface, comprising:
   a service station for receiving a handheld jet dispensing apparatus in a service compartment of the service station; and
   a memory component that stores logic that, when executed by a processor, causes the system to perform at least the following:
   determine if a maintenance function is to be implemented on the handheld jet dispensing apparatus;
   in response to determining that the maintenance function is to be implemented, determine if the service station is closed;
   if the service station is closed, engage an interface function of the service station during the maintenance function, wherein the interface function is related to accessing the service compartment;
   determine that the maintenance function has ended; and
   in response to determining that the maintenance function has ended, disengage the interface function.

2. The system of claim 1, wherein the handheld jet dispensing apparatus comprises a camera lens and a cartridge with at least one nozzle, wherein the maintenance function comprises at least one of the following: wiping of the camera lens, wiping of the cartridge nozzle, jetting solution into a reservoir, and calibrating the service station.

3. The system of claim 1, wherein the interface function comprises at least one of the following: a locking mechanism to prevent access to the service compartment, a visual output to inform a user of restricted access to the service compartment, a tactile output to inform the user of restricted access to the service compartment, audible indication to inform the user of restricted access to the service compartment, and a timer to determine a time that restricted access to the service compartment will be removed.

4. The system of claim 3, wherein the logic further causes the system to perform at least one of the following:
provide a first user option to override the locking mechanism to provide immediate access to the service compartment; and
provide a second user option to manually engage the locking mechanism of the service station.

5. The system of claim 1, wherein the interface function comprises a locking mechanism and wherein the logic further causes the system to perform at least the following:
provide a user option to disengage the locking mechanism of the service station;
determine a time that the maintenance function may be interrupted; and
provide a user with the time to indicate when the locking mechanism of the service station will be disengaged.

6. The system of claim 5, wherein the logic further causes the system to perform at least the following:
in response to reaching the time, interrupt the maintenance function and disengage the locking mechanism;
determine that the service station has been opened;
determine that the service station has been closed;
reengage the locking mechanism; and
resume the maintenance function.

7. The system of claim 1, further comprising at least one of the following: a first physical contact on the service station and a first physical contact on the handheld jet dispensing apparatus for charging the handheld jet dispensing apparatus, a second physical contact on the service station and a second physical contact on the handheld jet dispensing apparatus for facilitating communication between the service station and the handheld jet dispensing apparatus, a first wireless connection between the service station and the handheld jet dispensing apparatus for charging the handheld jet dispensing apparatus, and a second wireless connection between the service station and the handheld jet dispensing apparatus for facilitating communication between the service station and the handheld jet dispensing apparatus.

8. A method for providing a service station interface, comprising:
detecting that a handheld jet dispensing apparatus has been removed from a service station, wherein the handheld jet dispensing apparatus comprises a camera lens and a cartridge nozzle;
determining whether a time that the handheld jet dispensing apparatus is remote from the service station meets a predetermined threshold time;
in response to determining that the time that the handheld jet dispensing apparatus is remote from the service station meets the predetermined threshold time, providing a first interface function related to the handheld jet dispensing apparatus being remote from the service station;
in response to the service station receiving the handheld jet dispensing apparatus and determining that the service station is closed, beginning a maintenance function and engaging a second interface function related to the maintenance function; and
in response to determining that the maintenance function has ended, disengaging the second interface function.

9. The method of claim 8, wherein the maintenance function comprises at least one of the following: wiping of the camera lens, wiping of the cartridge nozzle, jetting solution into a reservoir, and calibrating the service station.

10. The method of claim 8, further comprising:
determining a time that the maintenance function may be interrupted;
receiving a user instruction to interrupt the maintenance function and disengage the second interface function; and
providing a user with the time when the second interface function will be disengaged.

11. The method of claim 10,
in response to reaching the time, interrupting the maintenance function and disengaging the second interface function;
determining that the service station has been opened;
determining that the service station has been closed;
reengaging the second interface function; and
resuming the maintenance function.

12. The method of claim 8, wherein the first interface function comprises at least one of the following: a visual indication instructing a user to return the handheld jet dispensing apparatus to the service station, an audible indication instructing the user to return the handheld jet dispensing apparatus to the service station, and a tactile indication instructing the user to return the handheld jet dispensing apparatus to the service station.

13. The method of claim 8, wherein the second interface function comprises at least one of the following: a locking mechanism, a visual indication, an audible indication, and a tactile indication.

14. The method of claim 8, further comprising:
determining that the service station has been opened; and
in response to determining that the service station has been opened, providing a third interface function, wherein the third interface function comprises at least one of the following: a visual indication instructing a user to close the service station, an audible indication instructing the user to close the service station, and a tactile indication instructing the user to close the service station.

15. A non-transitory computer-readable medium for providing an interface function for a service station that stores logic that, when executed by a processor, causes the service station to perform the following:
receive an instruction to implement a maintenance function on a handheld jet dispensing apparatus, wherein the handheld jet dispensing apparatus comprises a camera lens and a cartridge nozzle;
engage the interface function of the service station to restrict access by a user to the service compartment of the service station during the maintenance function;
determine that the maintenance function has ended;
in response to determining that the maintenance function has ended, disengage the interface function.

16. The non-transitory computer-readable medium of claim 15, wherein the logic further causes the service station to perform at least the following:
determine whether the service station is closed; and
in response to determining that the service station is not closed, provide an indication to close the service station.

17. The non-transitory computer-readable medium of claim 15, wherein the maintenance function comprises at least one of the following: wiping of the camera lens, wiping of the cartridge nozzle, jetting solution into a reservoir, and calibrating the service station.

18. The non-transitory computer-readable medium of claim 15, wherein logic further causes the service station to perform at least the following:
- determine a time that the maintenance function may be interrupted;
- provide a user option to interrupt the maintenance function;
- provide the user with the time when the interface function of the service station will be disengaged;
- in response to a user selection of the user option to interrupt the maintenance function and reaching the time, interrupt the maintenance function and disengaging the interface function;
- determine that the service station has been opened;
- determine that the service station has been closed;
- reengage the interface function; and
- resume the maintenance function.

19. The non-transitory computer-readable medium of claim 15, wherein the interface function comprises at least one of the following: a locking mechanism to prevent access to the service compartment, a visual output to inform a user of restricted access to the service compartment, a tactile output to inform the user of restricted access to the service compartment, audible indication to inform the user of restricted access to the service compartment, and a timer to determine a time that restricted access to the service compartment will be removed.

20. The non-transitory computer-readable medium of claim 15, wherein the logic further causes the service station to perform at least one of the following: charging the handheld jet dispensing apparatus via a first physical contact, facilitating communication between the service station and the handheld jet dispensing apparatus via a second physical contact, wirelessly charging the handheld jet dispensing apparatus, and wirelessly facilitating communication between the service station and the handheld jet dispensing apparatus.

* * * * *